(12) United States Patent
Delgado, Jr. et al.

(10) Patent No.: US 10,006,363 B2
(45) Date of Patent: Jun. 26, 2018

(54) SYSTEM AND METHOD FOR AVIATION ELECTRIC POWER PRODUCTION

(71) Applicant: General Electric Company, Schenectady, NY (US)

(72) Inventors: Adon Delgado, Jr., Cincinnati, OH (US); Todd James Buchholz, Cincinnati, OH (US); Christopher Dale Mathias, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 14/655,747

(22) PCT Filed: Nov. 26, 2013

(86) PCT No.: PCT/US2013/071831
§ 371 (c)(1),
(2) Date: Jun. 26, 2015

(87) PCT Pub. No.: WO2014/105334
PCT Pub. Date: Jul. 3, 2014

(65) Prior Publication Data
US 2015/0330303 A1    Nov. 19, 2015

Related U.S. Application Data

(60) Provisional application No. 61/746,731, filed on Dec. 28, 2012.

(51) Int. Cl.
*F02C 6/00*    (2006.01)
*F02C 3/22*    (2006.01)
(Continued)

(52) U.S. Cl.
CPC ............... *F02C 3/22* (2013.01); *B64D 37/30* (2013.01); *B64D 41/00* (2013.01); *F02C 6/08* (2013.01);
(Continued)

(58) Field of Classification Search
USPC ......... 60/207, 604, 730, 690, 722, 787, 788, 60/793, 39.21, 801, 802, 39.34, 702
See application file for complete search history.

(56) References Cited

U.S. PATENT DOCUMENTS 6,740,439 B2 *   5/2004   Ban ..................... F02G 1/043
                                                       429/479
7,207,521 B2     4/2007   Atkey et al.
(Continued)

FOREIGN PATENT DOCUMENTS

CA    2219293 C    1/2004
CN    1190161 A    8/1998
(Continued)

OTHER PUBLICATIONS

Unofficial English translation of Chinese Office Action issued in connection with corresponding CN Application No. 201380068526.7 dated Feb. 22, 2016.
(Continued)

*Primary Examiner* — Binh Q Tran
(74) *Attorney, Agent, or Firm* — General Electric Company; Pamela Kachur

(57) ABSTRACT

An electrical power system for an aircraft including a turbine engine coupled to the aircraft and providing propulsive thrust and emitting heat during operation to define a high temperature source, a cryogenic fuel system located within the aircraft and providing fuel for the turbine and emitting heat at a lower temperature than the heat from the turbine engine to define a low temperature source and an
(Continued)

electrical power generator located on the aircraft and having a thermodynamic generator using the temperature difference to generate electrical power and a method for producing electric power.

20 Claims, 10 Drawing Sheets

(51) Int. Cl.
 *F02C 6/08* (2006.01)
 *F02C 7/00* (2006.01)
 *B64D 37/30* (2006.01)
 *B64D 41/00* (2006.01)

(52) U.S. Cl.
 CPC ............ *F02C 7/00* (2013.01); *B64D 2221/00* (2013.01); *Y02T 50/44* (2013.01); *Y02T 50/53* (2013.01); *Y02T 90/44* (2013.01)

(56) References Cited

U.S. PATENT DOCUMENTS

| | | | |
|---|---|---|---|
| 7,419,022 B2 * | 9/2008 | Cox | B60L 11/00 180/309 |
| 7,663,264 B2 | 2/2010 | Dubois et al. | |
| 8,015,808 B2 * | 9/2011 | Keefer | F02B 43/10 60/517 |
| 8,051,655 B2 | 11/2011 | Silver et al. | |
| 8,962,968 B2 | 2/2015 | Brillet | |
| 9,188,285 B2 * | 11/2015 | Kalra | F23J 15/06 |
| 9,429,076 B2 * | 8/2016 | Smith | B64C 39/024 |
| 9,676,419 B2 * | 6/2017 | Furusaki | B62D 21/152 |
| 2008/0066796 A1 | 3/2008 | Mitchell et al. | |
| 2011/0131999 A1 | 6/2011 | Gao | |
| 2012/0042656 A1 * | 2/2012 | Donnelly | F01K 17/06 60/772 |
| 2012/0240882 A1 * | 9/2012 | Gao | B60K 11/02 123/41.55 |
| 2014/0157823 A1 * | 6/2014 | Rubio | F25J 1/0022 62/611 |

FOREIGN PATENT DOCUMENTS

| | | |
|---|---|---|
| CN | 1705585 A | 12/2005 |
| CN | 101044296 A | 9/2007 |
| CN | 101128967 A | 2/2008 |
| CN | 201985798 U | 9/2011 |
| CN | 102308401 A | 1/2012 |
| GB | 2447333 A | 9/2008 |
| WO | 2012045034 A2 | 4/2012 |

OTHER PUBLICATIONS

International Search Report and Written Opinion issued in connection with PCT application PCT/US2013/071831 dated May 16, 2014.

* cited by examiner

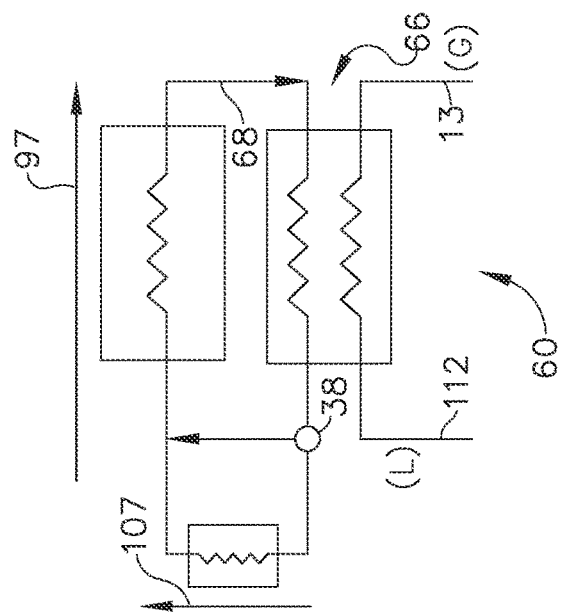
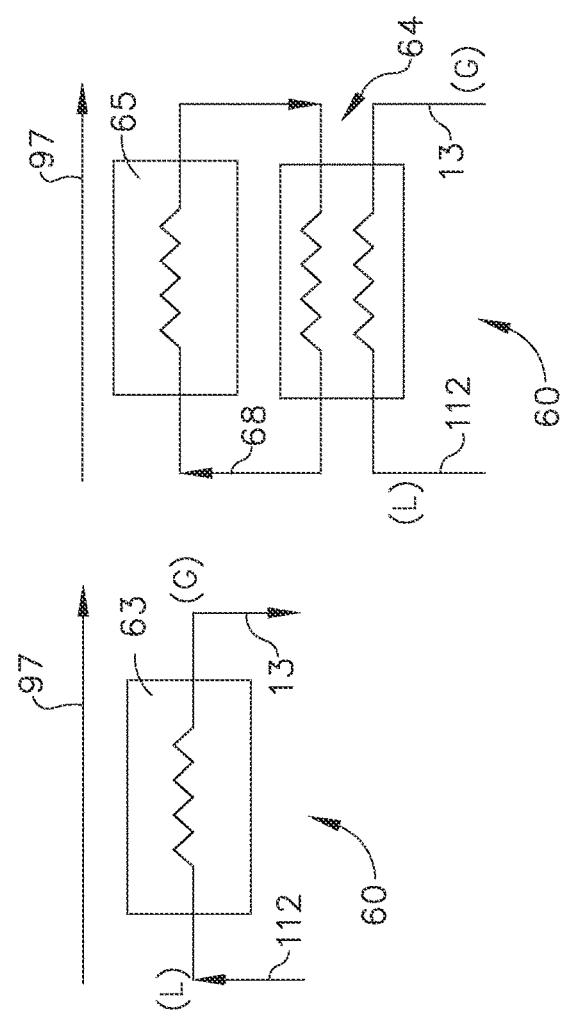
FIG. 6A  FIG. 6B  FIG. 6C

SYSTEM AND METHOD FOR AVIATION ELECTRIC POWER PRODUCTION

CROSS-REFERENCE TO RELATED APPLICATIONS

This is a national stage application under 35 U.S.C. § 371(c) of prior-filed, co-pending, PCT application serial number PCT/US2013/071831, filed on Nov. 26, 2013, which claims the benefit of U.S. Provisional Patent Application No. 61/746,731, filed on Dec. 28, 2012. These applications are incorporated herein in their entirety.

BACKGROUND

The technology described herein relates generally to aircraft systems, and more specifically to aircraft systems using dual fuels in an aviation gas turbine engine and a method of operating same.

Some aircraft engines may be configured to operate using one or more fuels, such as jet fuel and/or natural gas.

BRIEF DESCRIPTION OF EMBODIMENTS OF THE INVENTION

In one aspect, an embodiment of the invention relates to an electrical power system for an aircraft including a turbine engine coupled to the aircraft and providing propulsive thrust and emitting heat during operation to define a high temperature source, a cryogenic fuel system located within the aircraft and providing fuel for the turbine and emitting heat at a lower temperature than the heat from the turbine engine to define a low temperature source and an electrical power generator located on the aircraft and using the temperature difference between the high temperature source and the low temperature source to generate electrical power.

In another aspect, an embodiment of the invention relates to a method for producing electric power in an aircraft having an engine emitting a relatively high heat and a cryogenic system emitting a relatively low heat, the method comprising generating electricity using the temperature difference between the relatively high heat and the relatively low heat to generate electricity.

BRIEF DESCRIPTION OF THE DRAWINGS

The technology described herein may be best understood by reference to the following description taken in conjunction with the accompanying drawing figures in which:

FIG. 6a is a schematic view of an exemplary direct heat exchanger;

FIG. 6b is a schematic view of an exemplary indirect heat exchanger;

FIG. 6c is a schematic view of another exemplary indirect heat exchanger;

DESCRIPTION OF EMBODIMENTS OF THE INVENTION

Figure 1:
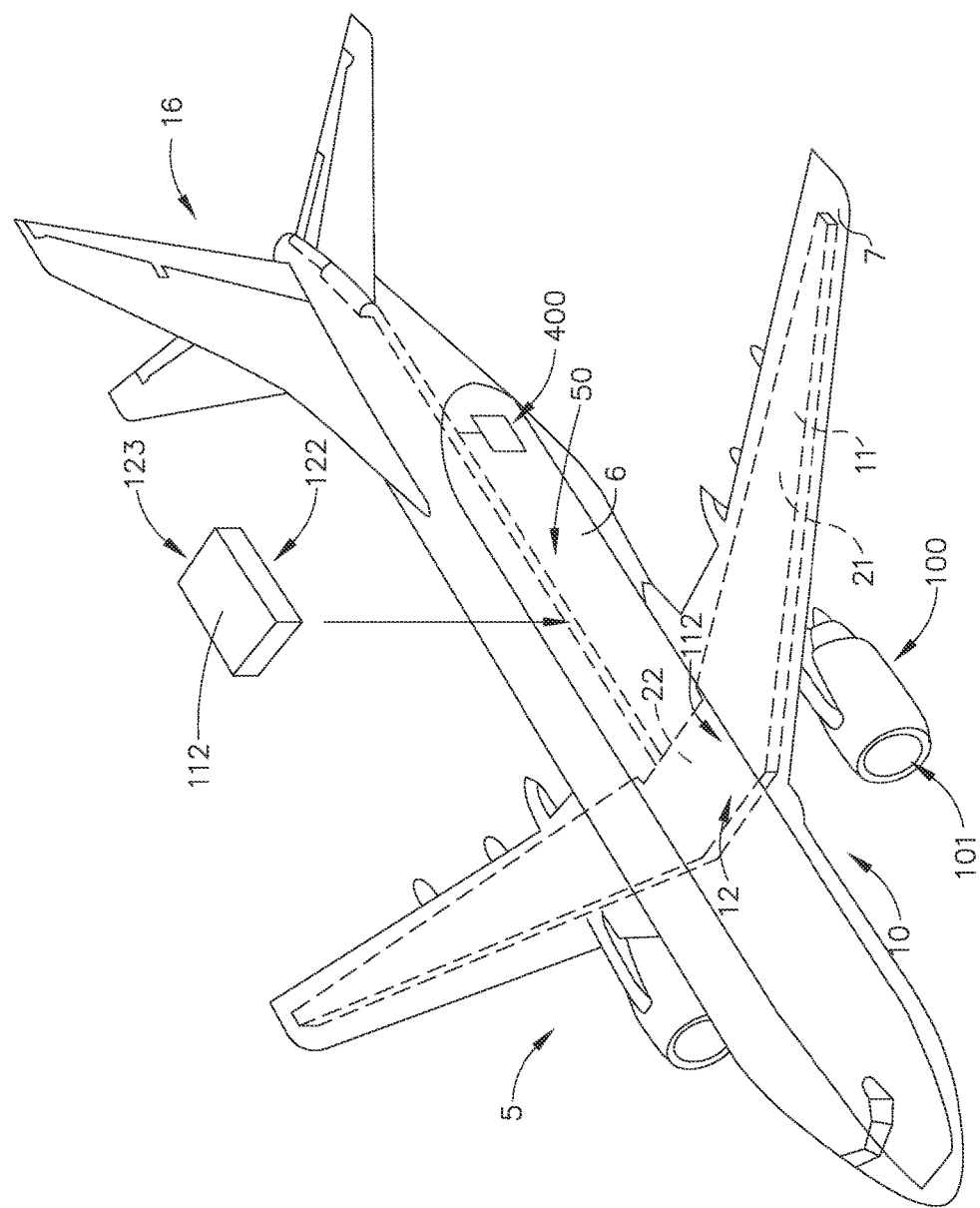
FIG. 1 is an isometric view of an exemplary aircraft system having a dual fuel propulsion system.

In the drawings, similar symbols typically identify similar components, unless context dictates otherwise. The illustrative embodiments described in the description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 shows an aircraft system 5 according to an exemplary embodiment of the present invention. The exemplary aircraft system 5 has a fuselage 6 and wings 7 attached to the fuselage. The aircraft system 5 has a propulsion system 100 that produces the propulsive thrust required to propel the aircraft system in flight. Although the propulsion system 100 is shown attached to the wing 7 in FIG. 1, in other embodiments it may be coupled to other parts of the aircraft system 5, such as, for example, the tail portion 16.

The exemplary aircraft system 5 has a fuel storage system 10 for storing one or more types of fuels that are used in the propulsion system 100. The exemplary aircraft system 5 shown in FIG. 1 uses two types of fuels, as explained further below herein. Accordingly, the exemplary aircraft system 5 comprises a first fuel tank 21 capable of storing a first fuel 11 and a second fuel tank 22 capable of storing a second fuel 12. In the exemplary aircraft system 5 shown in FIG. 1, at least a portion of the first fuel tank 21 is located in a wing 7 of the aircraft system 5. In one exemplary embodiment, shown in FIG. 1, the second fuel tank 22 is located in the fuselage 6 of the aircraft system near the location where the wings are coupled to the fuselage. In alternative embodiments, the second fuel tank 22 may be located at other suitable locations in the fuselage 6 or the wing 7. In other embodiments, the aircraft system 5 may comprise an optional third fuel tank 123 capable of storing the second fuel 12. The optional third fuel tank 123 may be located in an aft portion of the fuselage of the aircraft system, such as for example shown schematically in FIG. 1.

As further described later herein, the propulsion system 100 shown in FIG. 1 is a dual fuel propulsion system that is capable of generating propulsive thrust by using the first fuel 11 or the second fuel 12 or using both first fuel 11 and the second fuel 12. The exemplary dual fuel propulsion system 100 comprises a gas turbine engine 101 capable of generating a propulsive thrust selectively using the first fuel 11, or the second fuel 21, or using both the first fuel and the second fuel at selected proportions. The first fuel may be a conventional liquid fuel such as a kerosene based jet fuel such as known in the art as Jet-A, JP-8, or JP-5 or other known types or grades. In the exemplary embodiments described herein, the second fuel 12 is a cryogenic fuel that is stored at very low temperatures. In one embodiment described herein, the cryogenic second fuel 12 is Liquefied Natural Gas (alternatively referred to herein as "LNG"). The cryogenic second fuel 12 is stored in the fuel tank at a low temperature. For example, the LNG is stored in the second fuel tank 22 at about −265° F. at an absolute pressure of about 15 psia. The fuel tanks may be made from known materials such as titanium, Inconel, aluminum or composite materials.

The exemplary aircraft system 5 shown in FIG. 1 comprises a fuel delivery system 50 capable of delivering a fuel from the fuel storage system 10 to the propulsion system 100. Known fuel delivery systems may be used for delivering the conventional liquid fuel, such as the first fuel 11. In the exemplary embodiments described herein, and shown in FIGS. 1 and 2, the fuel delivery system 50 is configured to deliver a cryogenic liquid fuel, such as, for example, LNG, to the propulsion system 100 through conduits 54 that transport the cryogenic fuel. In order to substantially maintain a liquid state of the cryogenic fuel during delivery, at least a portion of the conduit 54 of the fuel delivery system 50 is insulated and configured for transporting a pressurized cryogenic liquid fuel. In some exemplary embodiments, at least a portion of the conduit 54 has a double wall construction. The conduits may be made from known materials such as titanium, Inconel, aluminum or composite materials.

The exemplary embodiment of the aircraft system 5 shown in FIG. 1 further includes a fuel cell system 400, comprising a fuel cell capable of producing electrical power using at least one of the first fuel 11 or the second fuel 12. The fuel delivery system 50 is capable of delivering a fuel from the fuel storage system 10 to the fuel cell system 400. In one exemplary embodiment, the fuel cell system 400 generates power using a portion of a cryogenic fuel 12 used by a dual fuel propulsion system 100.

Figure 4:
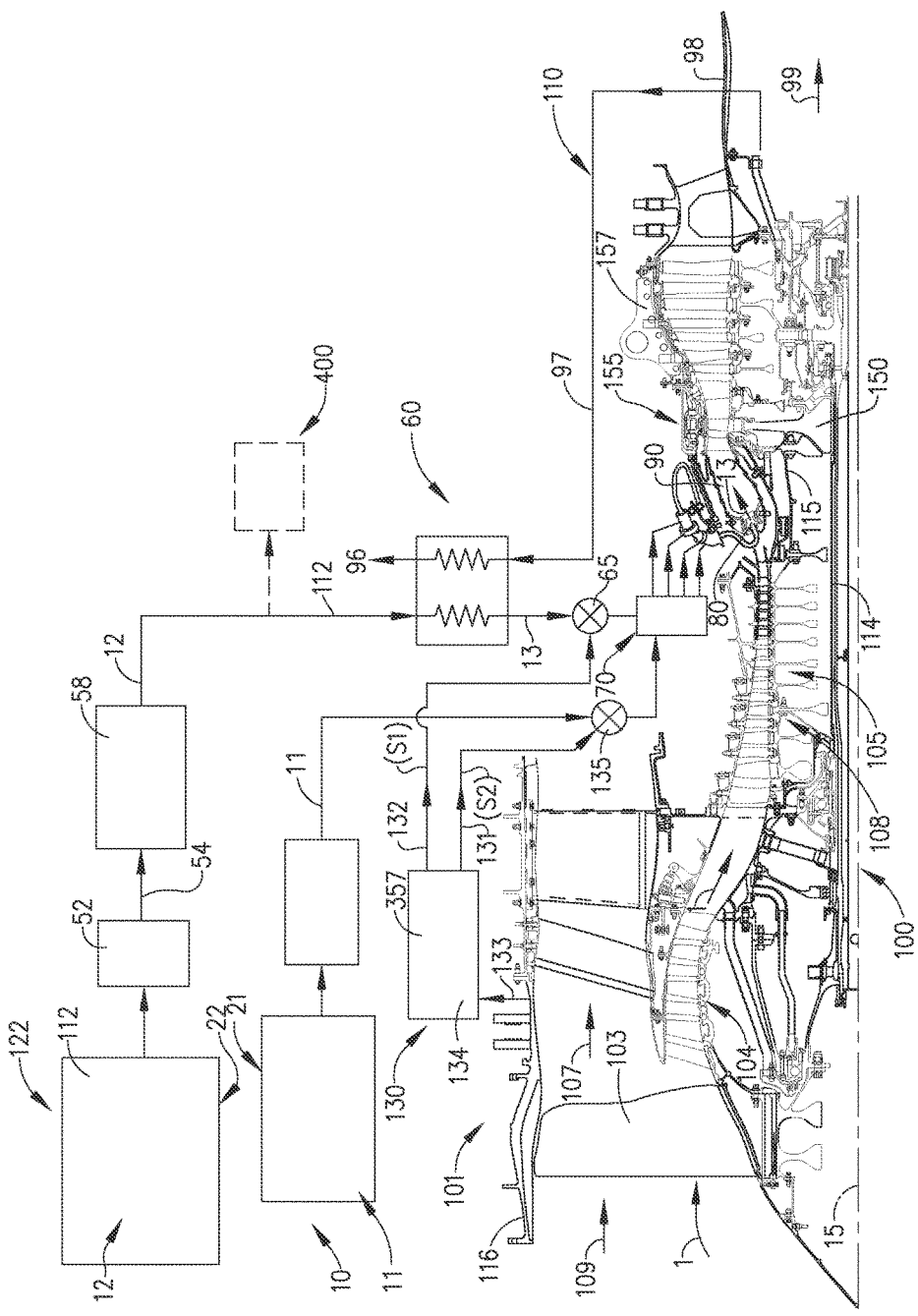
FIG. 4 is a schematic cross-sectional view of an exemplary dual fuel aircraft gas turbine engine having a fuel delivery and control system.

The propulsion system 100 comprises a gas turbine engine 101 that generates the propulsive thrust by burning a fuel in a combustor. FIG. 4 is a schematic view of an exemplary gas turbine engine 101 including a fan 103 and a core engine 108 having a high pressure compressor 105, and a combustor 90. Engine 101 also includes a high pressure turbine 155, a low pressure turbine 157, and a booster 104. The exemplary gas turbine engine 101 has a fan 103 that produces at least a portion of the propulsive thrust. Engine 101 has an intake side 109 and an exhaust side 110. Fan 103 and turbine 157 are coupled together using a first rotor shaft 114, and compressor 105 and turbine 155 are coupled together using a second rotor shaft 115. In some applications, such as, for example, shown in FIG. 4, the fan 103 blade assemblies are at least partially positioned within an engine casing 116. In other applications, the fan 103 may form a portion of an "open rotor" where there is no casing surrounding the fan blade assembly.

During operation, air flows axially through fan 103, in a direction that is substantially parallel to a central line axis 15 extending through engine 101, and compressed air is supplied to high pressure compressor 105. The highly compressed air is delivered to combustor 90. Hot gases (not shown in FIG. 4) from combustor 90 drives turbines 155 and 157. Turbine 157 drives fan 103 by way of shaft 114 and similarly, turbine 155 drives compressor 105 by way of shaft 115. In alternative embodiments, the engine 101 may have an additional compressor, sometimes known in the art as an intermediate pressure compressor, driven by another turbine stage (not shown in FIG. 4).

During operation of the aircraft system 5 (See exemplary flight profile shown in FIG. 7), the gas turbine engine 101 in the propulsion system 100 may use, for example, the first fuel 11 during a first selected portion of operation of propulsion system, such as for example, during take off. The propulsion system 100 may use the second fuel 12, such as, for example, LNG, during a second selected portion of operation of propulsion system such as during cruise. Alternatively, during selected portions of the operation of the aircraft system 5, the gas turbine engine 101 is capable of generating the propulsive thrust using both the first fuel 11 and the second fuel 12 simultaneously. The proportion of the first fuel and second fuel may be varied between 0% to 100% as appropriate during various stages of the operation of the propulsion system.

An aircraft and engine system, described herein, is capable of operation using two fuels, one of which may be a cryogenic fuel such as for example, LNG (liquefied natural gas), the other a conventional kerosene based jet fuel such as Jet-A, JP-8, JP-5 or similar grades available worldwide.

The Jet-A fuel system is similar to conventional aircraft fuel systems, with the exception of the fuel nozzles, which are capable of firing Jet-A and cryogenic/LNG to the combustor in proportions from 0-100%. In the embodiment shown in FIG. 1, the LNG system includes a fuel tank, which optionally contains the following features: (i) vent lines with appropriate check valves to maintain a specified pressure in the tank; (ii) drain lines for the liquid cryogenic fuel; (iii) gauging or other measurement capability to assess the temperature, pressure, and volume of cryogenic (LNG) fuel present in the tank; (iv) a boost pump located in the cryogenic (LNG) tank or optionally outside of the tank, which increases the pressure of the cryogenic (LNG) fuel to transport it to the engine; and (iv) an optional cryo-cooler to keep the tank at cryogenic temperatures indefinitely.

In an embodiment, the fuel tank will operate at or near atmospheric pressure, but can operate in the range of 0 to 100 psig. Alternative embodiments of the fuel system may include high tank pressures and temperatures. The cryogenic (LNG) fuel lines running from the tank and boost pump to the engine pylons may have the following features: (i) single or double wall construction; (ii) vacuum insulation or low thermal conductivity material insulation; and (iii) an optional cryo-cooler to re-circulate LNG flow to the tank without adding heat to the LNG tank. The cryogenic (LNG) fuel tank can be located in the aircraft where a conventional Jet-A auxiliary fuel tank is located on existing systems, for example, in the forward or aft cargo hold. Alternatively, a cryogenic (LNG) fuel tank can be located in the center wing tank location. An auxiliary fuel tank utilizing cryogenic (LNG) fuel may be designed so that it can be removed if cryogenic (LNG) fuel will not be used for an extended period of time.

A high pressure pump may be located in the pylon or on board the engine to raise the pressure of the cryogenic (LNG) fuel to levels sufficient to inject fuel into the gas turbine combustor. The pump may or may not raise the pressure of the LNG/cryogenic liquid above the critical pressure (Pc) of cryogenic (LNG) fuel. A heat exchanger, referred to herein as a "vaporizer," which may be mounted on or near the engine, adds thermal energy to the liquefied natural gas fuel, raising the temperature and volumetrically expanding the cryogenic (LNG) fuel. Heat (thermal energy) from the vaporizer can come from many sources. These include, but are not limited to: (i) the gas turbine exhaust; (ii) compressor intercooling; (iii) high pressure and/or low pressure turbine clearance control air; (iv) LPT pipe cooling parasitic air; (v) cooled cooling air from the HP turbine; (vi) lubricating oil; or (vii) on board avionics or electronics. The heat exchanger can be of various designs, including shell and tube, double pipe, fin plate, etc., and can flow in a co-current, counter current, or cross current manner. Heat exchange can occur in direct or indirect contact with the heat sources listed above.

A control valve is located downstream of the vaporizer/heat exchange unit described above. The purpose of the control valve is to meter the flow to a specified level into the fuel manifold across the range of operational conditions associated with the gas turbine engine operation. A secondary purpose of the control valve is to act as a back pressure regulator, setting the pressure of the system above the critical pressure of cryogenic (LNG) fuel.

A fuel manifold is located downstream of the control valve, which serves to uniformly distribute gaseous fuel to the gas turbine fuel nozzles. In some embodiments, the manifold can optionally act as a heat exchanger, transferring thermal energy from the core cowl compartment or other thermal surroundings to the cryogenic/LNG/natural gas fuel. A purge manifold system can optionally be employed with the fuel manifold to purge the fuel manifold with compressor air (CDP) when the gaseous fuel system is not in operation. This will prevent hot gas ingestion into the gaseous fuel nozzles due to circumferential pressure variations. Optionally, check valves in or near the fuel nozzles can prevent hot gas ingestion.

An exemplary embodiment of the system described herein may operate as follows: Cryogenic (LNG) fuel is located in the tank at about 15 psia and about −265° F. It is pumped to approximately 30 psi by the boost pump located on the aircraft. Liquid cryogenic (LNG) fuel flows across the wing via insulated double walled piping to the aircraft pylon where it is stepped up to about 100 to 1,500 psia and can be above or below the critical pressure of natural gas/methane. The cryogenic (LNG) fuel is then routed to the vaporizer where it volumetrically expands to a gas. The vaporizer may be sized to keep the Mach number and corresponding pressure losses low. Gaseous natural gas is then metered though a control valve and into the fuel manifold and fuel nozzles where it is combusted in an otherwise standard aviation gas turbine engine system, providing thrust to the airplane. As cycle conditions change, the pressure in the boost pump (about 30 psi for example) and the pressure in the HP pump (about 1,000 psi for example) are maintained at an approximately constant level. Flow is controlled by the metering valve. The variation in flow in combination with the appropriately sized fuel nozzles result in acceptable and varying pressures in the manifold.

The exemplary aircraft system 5 has a fuel delivery system for delivering one or more types of fuels from the storage system 10 for use in the propulsion system 100. For a conventional liquid fuel such as, for example, a kerosene based jet fuel, a conventional fuel delivery system may be used. The exemplary fuel delivery system described herein, and shown schematically in FIGS. 2 and 3, comprises a cryogenic fuel delivery system 50 for an aircraft system 5. The exemplary fuel system 50 shown in FIG. 2 comprises a cryogenic fuel tank 122 capable of storing a cryogenic liquid fuel 112. In one embodiment, the cryogenic liquid fuel 112 is LNG. Other alternative cryogenic liquid fuels may also be used. In the exemplary fuel system 50, the cryogenic liquid fuel 112, such as, for example, LNG, is at a first pressure "P1". In an embodiment, the pressure P1 is close to atmospheric pressure, such as, for example, 15 psia.

The exemplary fuel system 50 has a boost pump 52 such that it is in flow communication with the cryogenic fuel tank 122. During operation, when cryogenic fuel is needed in the dual fuel propulsion system 100, the boost pump 52 removes a portion of the cryogenic liquid fuel 112 from the cryogenic fuel tank 122 and increases its pressure to a second pressure "P2" and flows it into a wing supply conduit 54 located in a wing 7 of the aircraft system 5. The pressure P2 is chosen such that the liquid cryogenic fuel maintains its liquid state (L) during the flow in the supply conduit 54. The pressure P2 may be in the range of about 30 psia to about 40 psia. Based on analysis using known methods, for LNG, 30 psia is found to be adequate. The boost pump 52 may be located at a suitable location in the fuselage 6 of the aircraft system 5. Alternatively, the boost pump 52 may be located close to the cryogenic fuel tank 122. In other embodiments, the boost pump 52 may be located inside the cryogenic fuel tank 122. In order to substantially maintain a liquid state of the cryogenic fuel during delivery, at least a portion of the wing supply conduit 54 is insulated. In some exemplary embodiments, at least a portion of the conduit 54 has a double wall construction. The conduits 54 and the boost pump 52 may be made using known materials such as titanium, Inconel, aluminum or composite materials.

The exemplary fuel system 50 has a high-pressure pump 58 that is in flow communication with the wing supply conduit 54 and is capable of receiving the cryogenic liquid fuel 112 supplied by the boost pump 52. The high-pressure pump 58 increases the pressure of the liquid cryogenic fuel (such as, for example, LNG) to a third pressure "P3" sufficient to inject the fuel into the propulsion system 100. The pressure P3 may be in the range of about 100 psia to about 1000 psia. The high-pressure pump 58 may be located at a suitable location in the aircraft system 5 or the propulsion system 100. In an embodiment, the high-pressure pump 58 is located in a pylon 55 of aircraft system 5 that supports the propulsion system 100.

Figure 2:
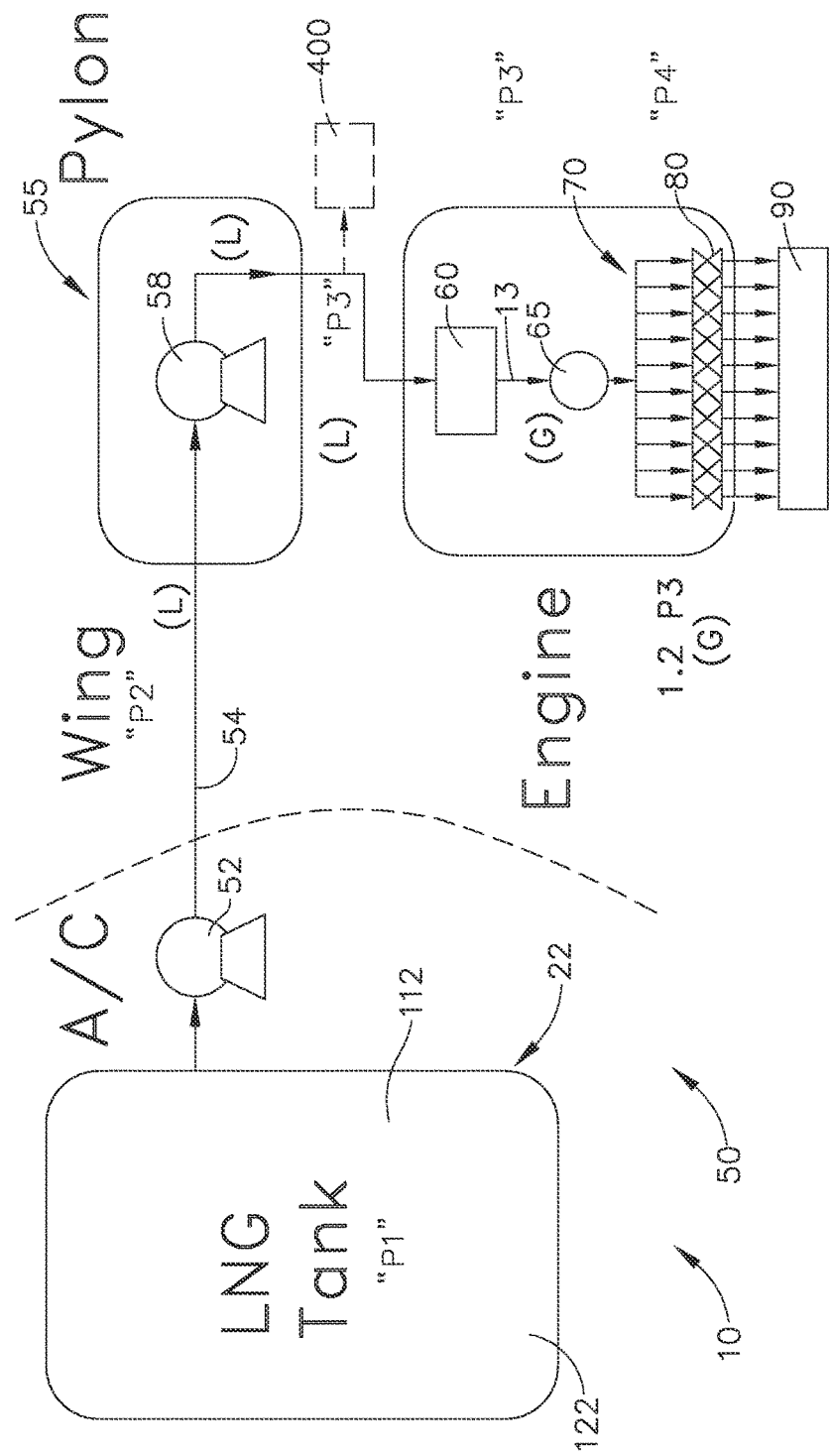
FIG. 2 is an exemplary fuel delivery/distribution system.

As shown in FIG. 2, the exemplary fuel system 50 has a vaporizer 60 for changing the cryogenic liquid fuel 112 into a gaseous (G) fuel 13. The vaporizer 60 receives the high pressure cryogenic liquid fuel and adds heat (thermal energy) to the cryogenic liquid fuel (such as, for example, LNG) raising its temperature and volumetrically expanding it. Heat (thermal energy) can be supplied from one or more sources in the propulsion system 100. For example, heat for vaporizing the cryogenic liquid fuel in the vaporizer may be supplied from one or more of several sources, such as, for example, the gas turbine exhaust 99, compressor 105, high pressure turbine 155, low pressure turbine 157, fan bypass 107, turbine cooling air, lubricating oil in the engine, aircraft system avionics/electronics, or any source of heat in the propulsion system 100. Due to the exchange of heat that occurs in the vaporizer 60, the vaporizer 60 may be alternatively referred to as a heat exchanger. The heat exchanger portion of the vaporizer 60 may include a shell and tube type heat exchanger, or a double pipe type heat exchanger, or fin-and-plate type heat exchanger. The hot fluid and cold fluid flow in the vaporizer may be co-current, or counter-current, or a cross current flow type. The heat exchange between the hot fluid and the cold fluid in the vaporizer may occur directly through a wall or indirectly, using an intermediate work fluid.

Figure 2A:
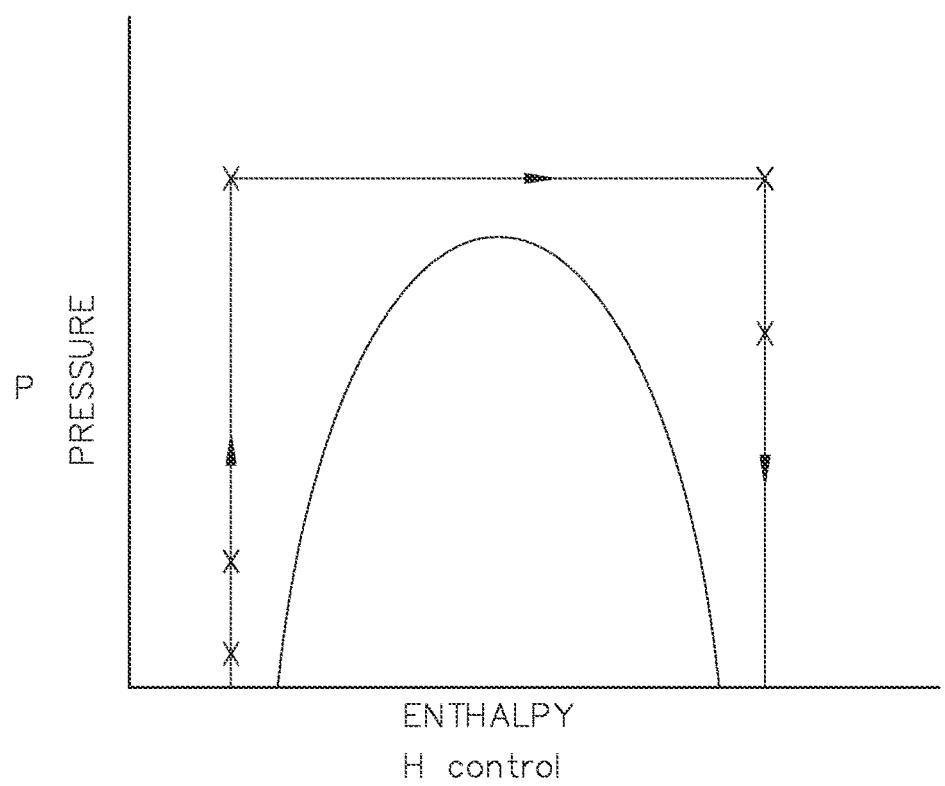
FIG. 2a is an exemplary operating path in a schematic pressure-enthalpy chart of an exemplary cryogenic fuel.

The cryogenic fuel delivery system 50 comprises a flow metering valve 65 ("FMV", also referred to as a Control Valve) that is in flow communication with the vaporizer 60 and a manifold 70. The flow metering valve 65 is located downstream of the vaporizer/heat exchange unit described above. The purpose of the FMV (control valve) is to meter the fuel flow to a specified level into the fuel manifold 70 across the range of operational conditions associated with the gas turbine engine operation. A secondary purpose of the control valve is to act as a back pressure regulator, setting the pressure of the system above the critical pressure of the cryogenic fuel such as LNG. The flow metering valve 65 receives the gaseous fuel 13 supplied from the vaporizer and reduces its pressure to a fourth pressure "P4". The manifold 70 is capable of receiving the gaseous fuel 13 and distributing it to a fuel nozzle 80 in the gas turbine engine 101. In an embodiment, the vaporizer 60 changes the cryogenic liquid fuel 112 into the gaseous fuel 13 at a substantially constant pressure. FIG. 2a schematically shows the state and pressure of the fuel at various points in the delivery system 50.

The cryogenic fuel delivery system 50 further comprises a plurality of fuel nozzles 80 located in the gas turbine engine 101. The fuel nozzle 80 delivers the gaseous fuel 13 into the combustor 90 for combustion. The fuel manifold 70, located downstream of the control valve 65, serves to uniformly distribute gaseous fuel 13 to the gas turbine fuel nozzles 80. In some embodiments, the manifold 70 can optionally act as a heat exchanger, transferring thermal energy from the propulsion system core cowl compartment or other thermal surroundings to the LNG/natural gas fuel. In one embodiment, the fuel nozzle 80 is configured to selectively receive a conventional liquid fuel (such as the conventional kerosene based liquid fuel) or the gaseous fuel 13 generated by the vaporizer from the cryogenic liquid fuel such as LNG. In another embodiment, the fuel nozzle 80 is configured to selectively receive a liquid fuel and the gaseous fuel 13 and configured to supply the gaseous fuel 13 and a liquid fuel to the combustor 90 to facilitate co-combustion of the two types of fuels. In another embodiment, the gas turbine engine 101 comprises a plurality of fuel nozzles 80 wherein some of the fuel nozzles 80 are configured to receive a liquid fuel and some of the fuel nozzles 80 are configured to receive the gaseous fuel 13 and arranged suitably for combustion in the combustor 90.

In another embodiment of the present invention, fuel manifold 70 in the gas turbine engine 101 comprises an optional purge manifold system to purge the fuel manifold with compressor air, or other air, from the engine when the gaseous fuel system is not in operation. This will prevent hot gas ingestion into the gaseous fuel nozzles due to circumferential pressure variations in the combustor 90. Optionally, check valves in or near the fuel nozzles can be used prevent hot gas ingestion in the fuel nozzles or manifold.

In an exemplary dual fuel gas turbine propulsion system described herein that uses LNG as the cryogenic liquid fuel is described as follows: LNG is located in the tank 22, 122 at 15 psia and −265° F. It is pumped to approximately 30 psi by the boost pump 52 located on the aircraft. Liquid LNG flows across the wing 7 via insulated double walled piping 54 to the aircraft pylon 55 where it is stepped up to 100 to 1,500 psia and may be above or below the critical pressure of natural gas/methane. The Liquefied Natural Gas is then routed to the vaporizer 60 where it volumetrically expands to a gas. The vaporizer 60 is sized to keep the Mach number and corresponding pressure losses low. Gaseous natural gas is then metered though a control valve 65 and into the fuel manifold 70 and fuel nozzles 80 where it is combusted in an dual fuel aviation gas turbine system 100, 101, providing thrust to the aircraft system 5. As cycle conditions change, the pressure in the boost pump (30 psi) and the pressure in the HP pump 58 (1,000 psi) are maintained at an approximately constant level. Flow is controlled by the metering valve 65. The variation in flow in combination with the appropriately sized fuel nozzles result in acceptable and varying pressures in the manifold.

The dual fuel system consists of parallel fuel delivery systems for kerosene based fuel (Jet-A, JP-8, JP-5, etc) and a cryogenic fuel (LNG for example). The kerosene fuel delivery is substantially unchanged from the current design, with the exception of the combustor fuel nozzles, which are designed to co-fire kerosene and natural gas in any proportion. As shown in FIG. 2, the cryogenic fuel (LNG for example) fuel delivery system consists of the following features: (A) A dual fuel nozzle and combustion system, capable of utilizing cryogenic fuel (LNG for example), and Jet-A in any proportion from 0- to 100%; (B) A fuel manifold and delivery system that also acts as a heat exchanger, heating cryogenic fuel (LNG for example) to a gas or a supercritical fluid. The manifold system is designed to concurrently deliver fuel to the combustor fuel nozzles in a uniform manner, and absorb heat from the surrounding core cowl, exhaust system, or other heat source, eliminating or minimizing the need for a separate heat exchanger; (C) A fuel system that pumps up cryogenic fuel (LNG for example) in its liquid state above or below the critical pressure and adds heat from any of a number of sources; (D) A low pressure cryo-pump submerged in the cryogenic fuel (LNG for example) fuel tank (optionally located outside the fuel tank.); (E) A high pressure cryo-pump located in the aircraft pylon or optionally on board the engine or nacelle to pump to pressures above the critical pressure of cryogenic fuel (LNG for example). (F) A purge manifold system can optionally employed with the fuel manifold to purge the fuel manifold with compressor CDP air when the gaseous fuel system is not in operation. This will prevent hot gas ingestion into the gaseous fuel nozzles due to circumferential pressure variations. Optionally, check valves in or near the fuel nozzles can prevent hot gas ingestion. (G) cryogenic fuel (LNG for example) lines running from the tank and boost pump to the engine pylons have the following features: (1) Single or double wall construction. (2) Vacuum insulation or optionally low thermal conductivity insulation material such as aerogels. (3) An optional cryo-cooler to recirculate cryogenic fuel (LNG for example) flow to the tank without adding heat to the cryogenic fuel (LNG for example) tank. (H) A high pressure pump located in the pylon or on board the engine. This pump will raise the pressure of the cryogenic fuel (LNG for example) to levels sufficient to inject natural gas fuel into the gas turbine combustor. The pump may or may not raise the pressure of the cryogenic liquid (LNG for example) above the critical pressure (Pc) of cryogenic fuel (LNG for example).

Figure 3:
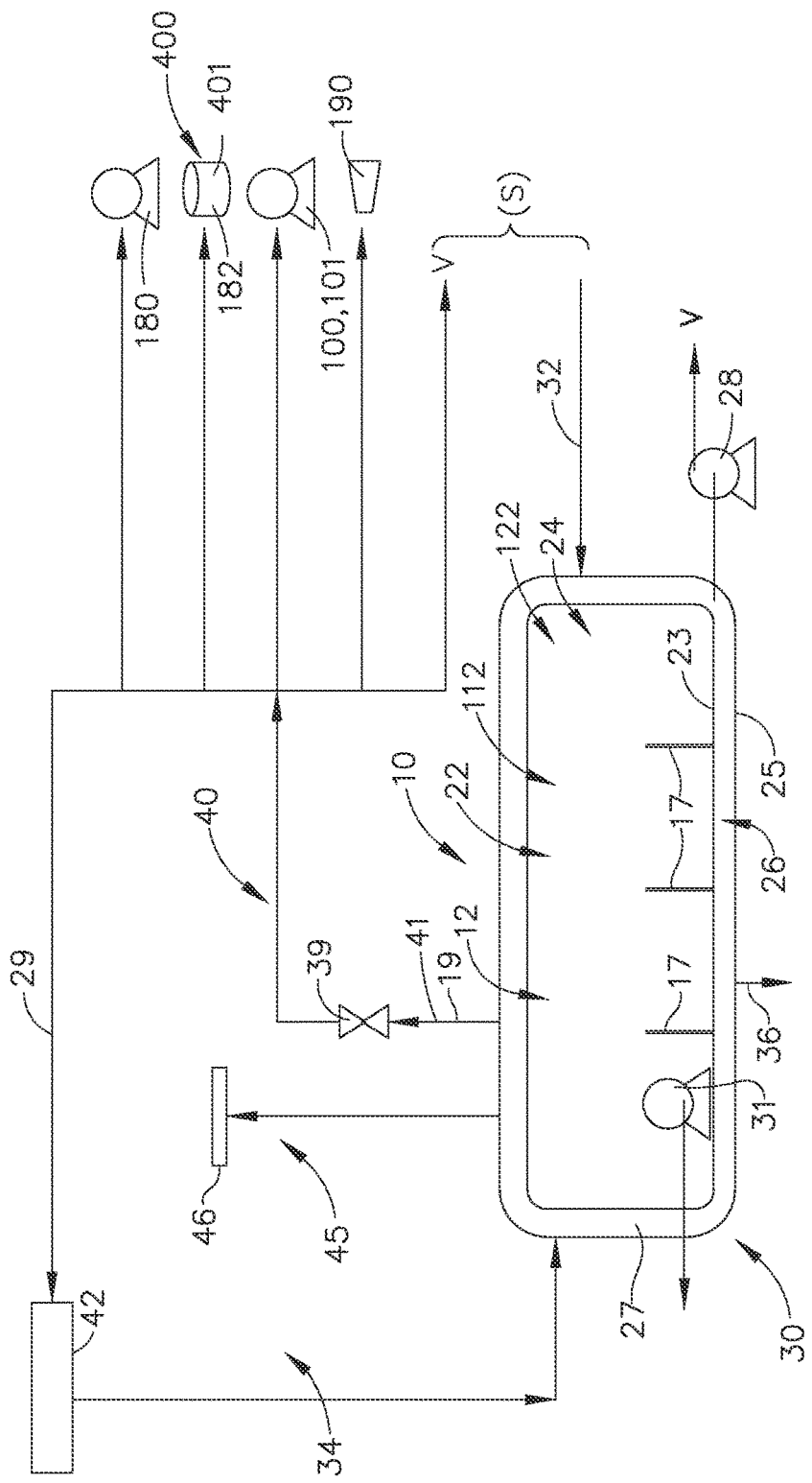
FIG. 3 is a schematic figure showing exemplary arrangement of a fuel tank and exemplary boil off usage.

The exemplary aircraft system 5 shown in FIG. 1 comprises a cryogenic fuel storage system 10, such as shown for example, in FIG. 3, for storing a cryogenic fuel. The exemplary cryogenic fuel storage system 10 comprises a cryogenic fuel tank 22, 122 having a first wall 23 forming a storage volume 24 capable of storing a cryogenic liquid fuel 12 such as for example LNG. As shown schematically in FIG. 3, the exemplary cryogenic fuel storage system 10 has an inflow system 32 capable of flowing the cryogenic liquid fuel 12 into the storage volume 24 and an outflow system 30 adapted to deliver the cryogenic liquid fuel 12 from the cryogenic fuel storage system 10. It further comprises a vent system 40 capable of removing at least a portion of a gaseous fuel 19 (that may be formed during storage) from the cryogenic liquid fuel 12 in the storage volume 24.

The exemplary cryogenic fuel storage system 10 shown in FIG. 3 further comprises a recycle system 34 that is adapted to return at least a portion 29 of unused gaseous fuel 19 into the cryogenic fuel tank 22. In one embodiment, the recycle system 34 comprises a cryo-cooler 42 that cools the portion 29 of unused gaseous fuel 19 prior to returning it into the cryogenic fuel tank 22, 122. An exemplary operation of the cryo-cooler 42 operation is as follows: In an exemplary embodiment, boil off from the fuel tank can be re-cooled using a reverse Rankine refrigeration system, also known as a cryo-cooler. The cryo-cooler can be powered by electric power coming from any of the available systems on board the aircraft system 5, or, by ground based power systems such as those which may be available while parked at a boarding gate. The cryo-cooler system can also be used to re-liquefy natural gas in the fuel system during the dual fuel aircraft gas turbine engine 101 co-fire transitions.

The fuel storage system 10 may further comprise a safety release system 45 adapted to vent any high pressure gases that may be formed in the cryogenic fuel tank 22. In one exemplary embodiment, shown schematically in FIG. 3, the safety release system 45 comprises a rupture disk 46 that forms a portion of the first wall 23. The rupture disk 46 is a safety feature, designed using known methods, to blow out and release any high pressure gases in the event of an over pressure inside the fuel tank 22.

The cryogenic fuel tank 22 may have a single wall construction or a multiple wall construction. For example, the cryogenic fuel tank 22 may further comprise (See FIG. 3 for example) a second wall 25 that substantially encloses the first wall 23. In one embodiment of the tank, there is a gap 26 between the first wall 23 and the second wall 25 in order to thermally insulate the tank to reduce heat flow across the tank walls. In one exemplary embodiment, there is a vacuum in the gap 26 between the first wall 23 and the second wall 25. The vacuum may be created and maintained by a vacuum pump 28. Alternatively, in order to provide thermal insulation for the tank, the gap 26 between the first wall 23 and the second wall 25 may be substantially filled with a known thermal insulation material 27, such as, for example, Aerogel. Other suitable thermal insulation materials may be used. Baffles 17 may be included to control movement of liquid within the tank.

The cryogenic fuel storage system 10 shown in FIG. 3 comprises the outflow system 30 having a delivery pump 31. The delivery pump may be located at a convenient location near the tank 22. In order to reduce heat transfer in to the cryogenic fuel, in an embodiment, the delivery pump 31 is located in the cryogenic fuel tank 22 as shown schematically in FIG. 3. The vent system 40 vents any gases that may be formed in the fuel tank 22. These vented gases may be utilized in several useful ways in the aircraft system 5. A few of these are shown schematically in FIG. 3. For example at least a portion of the gaseous fuel 19 may be supplied to the aircraft propulsion system 100 for cooling or combustion in the engine. In another embodiment, the vent system 40 supplies at least a portion of the gaseous fuel 19 to a burner and further venting the combustion products from the burner safely outside the aircraft system 5. In another embodiment the vent system 40 supplies at least a portion of the gaseous fuel 19 to an auxiliary power unit 180 that supplies auxiliary power to the aircraft system 5. In another embodiment the vent system 40 supplies at least a portion of the gaseous fuel 19 to a fuel cell 182 that produces power. In another embodiment the vent system 40 releases at least a portion of the gaseous fuel 19 outside the cryogenic fuel tank 22.

The exemplary operation of the fuel storage system, its components including the fuel tank, and exemplary sub systems and components is described as follows.

Natural gas exists in liquid form (LNG) at temperatures of approximately about −260° F. and atmospheric pressure. To maintain these temperatures and pressures on board a passenger, cargo, military, or general aviation aircraft, the features identified below, in selected combinations, allow for safe, efficient, and cost effective storage of LNG. Referring to FIG. 3, these include: A fuel tank 21, 22 constructed of alloys such as, but not limited to, aluminum AL 5456 and higher strength aluminum AL 5086 or other suitable alloys. A fuel tank 21, 22 constructed of light weight composite material. The above tanks 21, 22 with a double wall vacuum feature for improved insulation and greatly reduced heat flow to the LNG fluid. The double walled tank also acts as a safety containment device in the rare case where the primary tank is ruptured. An alternative embodiment of either the above utilizing lightweight insulation 27, such as, for example, Aerogel, to minimize heat flow from the surroundings to the LNG tank and its contents. Aerogel insulation can be used in addition to, or in place of a double walled tank design. An optional vacuum pump 28 designed for active evacuation of the space between the double walled tank. The pump can operate off of LNG boil off fuel, LNG, Jet-A, electric power or any other power source available to the aircraft. An LNG tank with a cryogenic pump 31 submerged inside the primary tank for reduced heat transfer to the LNG fluid. An LNG tank with one or more drain lines 36 capable of removing LNG from the tank under normal or emergency conditions. The LNG drain line 36 is connected to a suitable cryogenic pump to increase the rate of removal beyond the drainage rate due to the LNG gravitational head. An LNG tank with one or more vent lines 41 for removal of gaseous natural gas, formed by the absorption of heat from the external environment. This vent line 41 system maintains the tank at a desired pressure by the use of a 1 way relief valve or back pressure valve 39. An LNG tank with a parallel safety relief system 45 to the main vent line, should an overpressure situation occur. A burst disk is an alternative feature or a parallel feature 46. The relief vent would direct gaseous fuel overboard. An LNG fuel tank, with some or all of the design features above, whose geometry is designed to conform to the existing envelope associated with a standard Jet-A auxiliary fuel tank such as those designed and available on commercially available aircrafts. An LNG fuel tank, with some or all of the design features above, whose geometry is designed to conform to and fit within the lower cargo hold(s) of conventional passenger and cargo aircraft such as those found on commercially available aircrafts.

Modifications to the center wing tank 22 of an existing or new aircraft to properly insulate the LNG, tank, and structural elements.

Venting and boil off systems are designed using known methods. Boil off of LNG is an evaporation process which absorbs energy and cools the tank and its contents. Boil off LNG can be utilized and/or consumed by a variety of different processes, in some cases providing useful work to the aircraft system, in other cases, simply combusting the fuel for a more environmentally acceptable design. For example, vent gas from the LNG tank consists primarily of methane and is used for any or all combinations of the following:

Routing to the Aircraft APU (Auxiliary Power Unit) 180. As shown in FIG. 3, a gaseous vent line from the tank is routed in series or in parallel to an Auxiliary Power Unit for use in the combustor. The APU can be an existing APU, typically found aboard commercial and military aircraft, or a separate APU dedicated to converting natural gas boil off to useful electric and/or mechanical power. A boil off natural gas compressor is utilized to compress the natural gas to the appropriate pressure required for utilization in the APU. The APU, in turn, provides electric power to any system on the engine or A/C.

Routing to one or more aircraft gas turbine engine(s) 101. As shown in FIG. 3, a natural gas vent line from the LNG fuel tank is routed to one or more of the main gas turbine engines 101 and provides an additional fuel source to the engine during operation. A natural gas compressor is utilized to pump the vent gas to the appropriate pressure required for utilization in the aircraft gas turbine engine.

Flared. As shown in FIG. 3, a natural gas vent line from the tank is routed to a small, dedicated vent combustor 190 with its own electric spark ignition system. In this manner methane gas is not released to the atmosphere. The products of combustion are vented, which results in a more environmentally acceptable system.

Vented. As shown in FIG. 3, a natural gas vent line from the tank is routed to the exhaust duct of one or more of the aircraft gas turbines. Alternatively, the vent line can be routed to the APU exhaust duct or a separate dedicated line to any of the aircraft trailing edges. Natural gas may be suitably vented to atmosphere at one or more of these locations As shown in FIG. 3, during ground operation, any of the systems can be designed such that a vent line 41 is attached to ground support equipment, which collects and utilizes the natural gas boil off in any ground based system. Venting can also take place during refueling operations with ground support equipment that can simultaneously inject fuel into the aircraft LNG tank using an inflow system 32 and capture and reuse vent gases (simultaneous venting and fueling indicated as (S) in FIG. 3).

IV. Propulsion (Engine) System

FIG. 4 shows an exemplary dual fuel propulsion system 100 comprising a gas turbine engine 101 capable of generating a propulsive thrust using a cryogenic liquid fuel 112. The gas turbine engine 101 comprises a compressor 105 driven by a high-pressure turbine 155 and a combustor 90 that burns a fuel and generates hot gases that drive the high-pressure turbine 155. The combustor 90 is capable of burning a conventional liquid fuel such as kerosene based fuel. The combustor 90 is also capable of burning a cryogenic fuel, such as, for example, LNG, that has been suitably prepared for combustion, such as, for example, by a vaporizer 60. FIG. 4 shows schematically a vaporizer 60 capable of changing the cryogenic liquid fuel 112 into a gaseous fuel 13. The dual fuel propulsion system 100 gas turbine engine 101 further comprises a fuel nozzle 80 that supplies the gaseous fuel 13 to the combustor 90 for ignition. In one exemplary embodiment, the cryogenic liquid fuel 112 used is Liquefied Natural Gas (LNG). In a turbo-fan type dual fuel propulsion system 100 (shown in FIG. 4 for example) the gas turbine engine 101 comprises a fan 103 located axially forward from the high-pressure compressor 105. A booster 104 (shown in FIG. 4) may be located axially between the fan 103 and the high-pressure compressor 105 wherein the fan and booster are driven by a low-pressure turbine 157. In other embodiments, the dual fuel propulsion system 100 gas turbine engine 101 may include an intermediate pressure compressor driven by an intermediate pressure turbine (both not shown in FIG. 4). The booster 104 (or an intermediate pressure compressor) increases the pressure of the air that enters the compressor 105 and facilitates the generation of higher pressure ratios by the compressor 105. In the exemplary embodiment shown in FIG. 4, the fan and the booster are driven by the low pressure turbine 157, and the high pressure compressor is driven the high pressure turbine 155.

Figure 5:
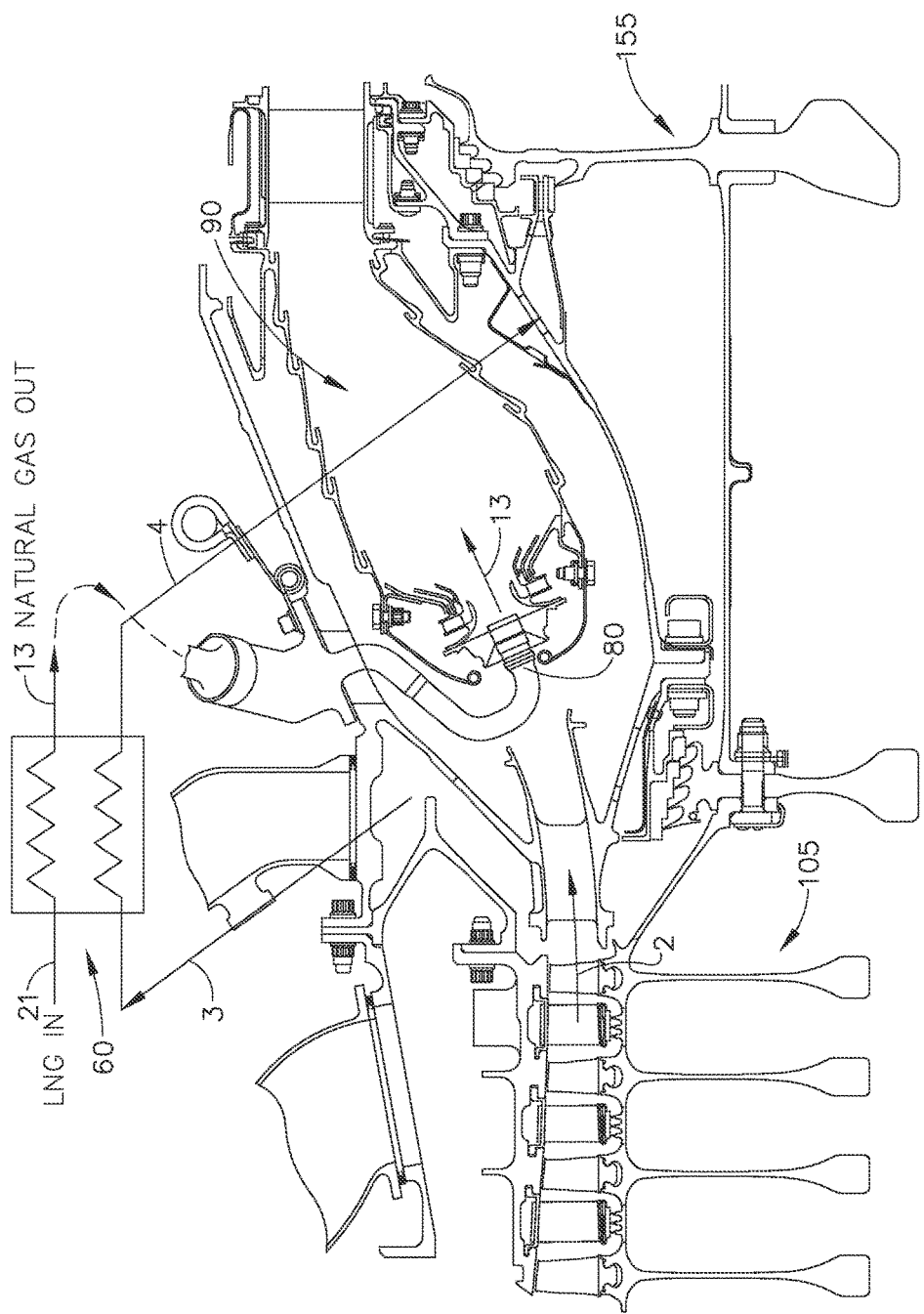
FIG. 5 is a schematic cross-sectional view of a portion of an exemplary dual fuel aircraft gas turbine engine showing a schematic heat exchanger.

The vaporizer 60, shown schematically in FIG. 4, is mounted on or near the engine 101. One of the functions of the vaporizer 60 is to add thermal energy to the cryogenic fuel, such as the liquefied natural gas (LNG) fuel, raising its temperature. In this context, the vaporizer functions as heat exchanger. Another, function of the vaporizer 60 is to volumetrically expand the cryogenic fuel, such as the liquefied natural gas (LNG) fuel to a gaseous form for later combustion. Heat (thermal energy) for use in the vaporizer 60 can come from or more of many sources in the propulsion system 100 and aircraft system 5. These include, but are not limited to: (i) The gas turbine exhaust, (ii) Compressor intercooling, (iii) High pressure and/or low pressure turbine clearance control air, (iv) LPT pipe cooling parasitic air, (v) cooling air used in the High pressure and/or low pressure turbine, (vi) Lubricating oil, and (vii) On board avionics, electronics in the aircraft system 5. The heat for the vaporizer may also be supplied from the compressor 105, booster 104, intermediate pressure compressor (not shown) and/or the fan bypass air stream 107 (See FIG. 4). An exemplary embodiment using a portion of the discharge air from the compressor 105 is shown in FIG. 5. A portion of the compressor discharge air 2 is bled out to the vaporizer 60, as shown by item 3 in FIG. 5. The cryogenic liquid fuel 21, such as for example, LNG, enters vaporizer 60 wherein the heat from the airflow stream 3 is transferred to the cryogenic liquid fuel 21. In one exemplary embodiment, the heated cryogenic fuel is further expanded, as described previously herein, producing gaseous fuel 13 in the vaporizer 60. The gaseous fuel 13 is then introduced into combustor 90 using a fuel nozzle 80 (See FIG. 5). The cooled airflow 4 that exits from the vaporizer can be used for cooling other engine components, such as the combustor 90 structures and/or the high-pressure turbine 155 structures. The heat exchanger portion in the vaporizer 60 can be of a known design, such as for example, shell and tube design, double pipe design, and/or fin plate design. The fuel 112 flow direction and the heating fluid 96 direction in the vaporizer 60 (see FIG. 4) may be in a co-current direction, counter-current direction, or they may flow in a cross-current manner to promote efficient heat exchange between the cryogenic fuel and the heating fluid.

Heat exchange in the vaporizer 60 can occur in direct manner between the cryogenic fuel and the heating fluid, through a metallic wall. FIG. 5 shows schematically a direct heat exchanger in the vaporizer 60. FIG. 6a shows schematically an exemplary direct heat exchanger 63 that uses a portion 97 of the gas turbine engine 101 exhaust gas 99 to heat the cryogenic liquid fuel 112. Alternatively, heat exchange in the vaporizer 60 can occur in an indirect manner between the cryogenic fuel and the heat sources listed above, through the use of an intermediate heating fluid. FIG. 6b shows an exemplary vaporizer 60 that uses an indirect heat exchanger 64 that uses an intermediary heating fluid 68 to heat the cryogenic liquid fuel 112. In such an indirect heat exchanger shown in FIG. 6b, the intermediary heating fluid 68 is heated by a portion 97 of the exhaust gas 99 from the gas turbine engine 101. Heat from the intermediary heating fluid 68 is then transferred to the cryogenic liquid fuel 112. FIG. 6c shows another embodiment of an indirect exchanger used in a vaporizer 60. In this alternative embodiment, the intermediary heating fluid 68 is heated by a portion of a fan bypass stream 107 of the gas turbine engine 101, as well as a portion 97 of the engine exhaust gas 99. The intermediary heating fluid 68 then heats the cryogenic liquid fuel 112. A control valve 38 is used to control the relative heat exchanges between the flow streams.

(V) Method of Operating Dual Fuel Aircraft System

Figure 7:
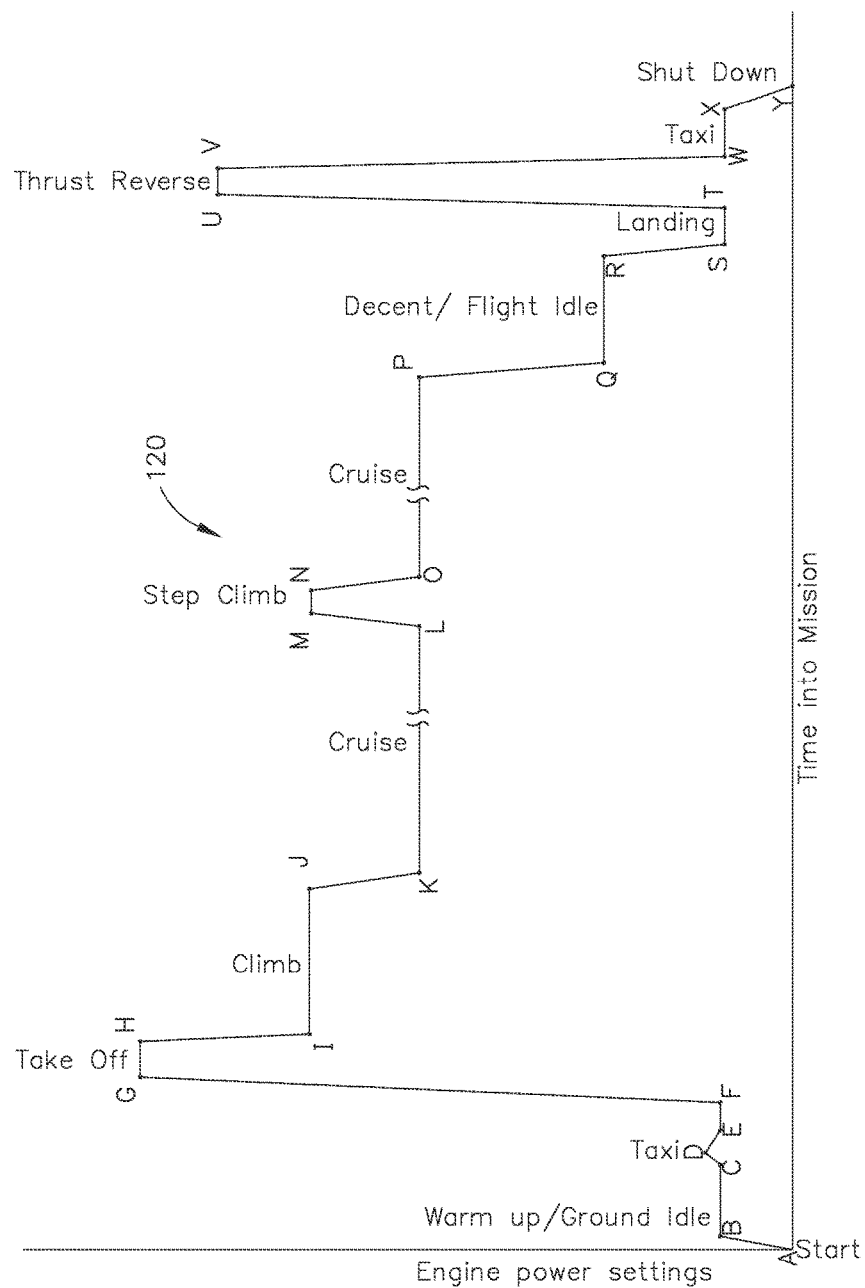
FIG. 7 is a schematic plot of an exemplary flight mission profile for the aircraft system.

An exemplary method of operation of the aircraft system 5 using a dual fuel propulsion system 100 is described as follows with respect to an exemplary flight mission profile shown schematically in FIG. 7. The exemplary flight mission profile shown schematically in FIG. 7 shows the Engine power setting during various portions of the flight mission identified by the letter labels A-B-C-D-E- . . . -X-Y etc. For example, A-B represents the start, B-C shows ground-idle, G-H shows take-off, T-L and O-P show cruise, etc. During operation of the aircraft system 5 (See exemplary flight profile 120 in FIG. 7), the gas turbine engine 101 in the propulsion system 100 may use, for example, the first fuel 11 during a first selected portion of operation of propulsion system, such as for example, during take off. The propulsion system 100 may use the second fuel 12, such as, for example, LNG, during a second selected portion of operation of propulsion system such as during cruise. Alternatively, during selected portions of the operation of the aircraft system 5, the gas turbine engine 101 is capable of generating the propulsive thrust using both the first fuel 11 and the second fuel 12 simultaneously. The proportion of the first fuel and second fuel may be varied between 0% to 100% as appropriate during various stages of the operation of the dual fuel propulsion system 100.

An exemplary method of operating a dual fuel propulsion system 100 using a dual fuel gas turbine engine 101 comprises the following steps of: starting the aircraft engine 101 (see A-B in FIG. 7) by burning a first fuel 11 in a combustor 90 that generates hot gases that drive a gas turbine in the engine 101. The first fuel 11 may be a known type of liquid fuel, such as a kerosene based Jet Fuel. The engine 101, when started, may produce enough hot gases that may be used to vaporize a second fuel, such as, for example, a cryogenic fuel. A second fuel 12 is then vaporized using heat in a vaporizer 60 to form a gaseous fuel 13. The second fuel may be a cryogenic liquid fuel 112, such as, for example, LNG. The operation of an exemplary vaporizer 60 has been described herein previously. The gaseous fuel 13 is then introduced into the combustor 90 of the engine 101 using a fuel nozzle 80 and the gaseous fuel 13 is burned in the combustor 90 that generates hot gases that drive the gas turbine in the engine. The amount of the second fuel introduced into the combustor may be controlled using a flow metering valve 65. The exemplary method may further comprise the step of stopping the supply of the first fuel 11 after starting the aircraft engine, if desired.

In the exemplary method of operating the dual fuel aircraft gas turbine engine 101, the step of vaporizing the second fuel 12 may be performed using heat from a hot gas extracted from a heat source in the engine 101. As described previously, in one embodiment of the method, the hot gas may be compressed air from a compressor 155 in the engine (for example, as shown in FIG. 5). In another embodiment of the method, the hot gas is supplied from an exhaust nozzle 98 or exhaust stream 99 of the engine (for example, as shown in FIG. 6a).

The exemplary method of operating a dual fuel aircraft engine 101, may, optionally, comprise the steps of using a selected proportion of the first fuel 11 and a second fuel 12 during selected portions of a flight profile 120, such as shown, for example, in FIG. 7, to generate hot gases that drive a gas turbine engine 101. The second fuel 12 may be a cryogenic liquid fuel 112, such as, for example, Liquefied Natural Gas (LNG). In the method above, the step of varying the proportion of the first fuel 12 and the second fuel 13 during different portions of the flight profile 120 (see FIG. 7) may be used to advantage to operate the aircraft system in an economic and efficient manner. This is possible, for example, in situations where the cost of the second fuel 12 is lower than the cost of the first fuel 11. This may be the case, for example, while using LNG as the second fuel 12 and kerosene based liquid fuels such as Jet-A fuel, as first fuel 11. In the exemplary method of operating a dual fuel aircraft engine 101, the proportion (ratio) of amount of the second fuel 12 used to the amount of the first fuel used may be varied between about 0% and 100%, depending on the portion of the flight mission. For example, in one exemplary method, the proportion of a cheaper second fuel used (such as LNG) to the kerosene based fuel used is about 100% during a cruise part of the flight profile, in order to minimize the cost of fuel. In another exemplary operating method, the proportion of the second fuel is about 50% during a take-off part of the flight profile that requires a much higher thrust level.

The exemplary method of operating a dual fuel aircraft engine 101 described above may further comprise the step of controlling the amounts of the first fuel 11 and the second fuel 12 introduced into the combustor 90 using a control system 130. An exemplary control system 130 is shown schematically in FIG. 4. The control system 130 sends a control signal 131 (S1) to a control valve 135 to control the amount of the first fuel 11 that is introduced to the combustor 90. The control system 130 also sends another control signal 132 (S2) to a control valve 65 to control the amount of the second fuel 12 that is introduced to the combustor 90. The proportion of the first fuel 11 and second fuel 12 used can be varied between 0% to 100% by a controller 134 that is programmed to vary the proportion as required during different flight segments of the flight profile 120. The control system 130 may also receive a feed back signal 133, based for example on the fan speed or the compressor speed or other suitable engine operating parameters. In one exemplary method, the control system may be a part of the engine control system, such as, for example, a Full Authority Digital Electronic Control (FADEC) 357. In another exemplary method, a mechanical or hydromechanical engine control system may form part or all of the control system.

The control system 130, 357 architecture and strategy is suitably designed to accomplish economic operation of the aircraft system 5. Control system feedback to the boost pump 52 and high pressure pump(s) 58 can be accomplished via the Engine FADEC 357 or by distributed computing with a separate control system that may, optionally, communicate with the Engine FADEC and with the aircraft system 5 control system through various available data busses.

The control system, such as for example, shown in FIG. 4, item 130, may vary pump 52, 58 speed and output to maintain a specified pressure across the wing 7 for safety purposes (for example at about 30-40 psi) and a different pressure downstream of the high pressure pump 58 (for example at about 100 to 1500 psi) to maintain a system pressure above the critical point of LNG and avoid two phase flow, and, to reduce the volume and weight of the LNG fuel delivery system by operation at high pressures and fuel densities.

In an exemplary control system 130, 357, the control system software may include any or all of the following logic: (A) A control system strategy that maximizes the use of the cryogenic fuel such as, for example, LNG, on takeoff and/or other points in the envelope at high compressor discharge temperatures (T3) and/or turbine inlet temperatures (T41); (B) A control system strategy that maximizes the use of cryogenic fuel such as, for example, LNG, on a mission to minimize fuel costs; (C) A control system 130, 357 that re-lights on the first fuel, such as, for example, Jet-A, only for altitude relights; (D) A control system 130, 357 that performs ground starts on conventional Jet-A only as a default setting; (E) A control system 130, 357 that defaults to Jet-A only during any non typical maneuver; (F) A control system 130, 357 that allows for manual (pilot commanded) selection of conventional fuel (like Jet-A) or cryogenic fuel such as, for example, LNG, in any proportion; (G) A control system 130, 357 that utilizes 100% conventional fuel (like Jet-A) for all fast accels and decels.

Embodiments of the invention contemplate a system that generates electrical power using generators coupled to the engines of the aircraft, which may raise the specific fuel consumption of the engines. Some example embodiments according to at least some aspects of the present disclosure may facilitate electrical power generation from waste heat on aircraft using cryogenic fuels in single and dual fuel engines. Some example embodiments may provide electrical power generation capability with a very small impact on specific fuel consumption. Example embodiments may be used in connection with any type of gas turbine aircraft engine (e.g., turbo-fan, turbo-jet, turbo-prop, open-rotor, etc.).

Such an electrical power system for an aircraft 5 may include a turbine engine 101 coupled to the aircraft 5 and providing propulsive thrust and emitting heat during operation to define a high temperature source, a cryogenic fuel system located within the aircraft 5 and providing fuel 12 for the turbine engine 101 and emitting heat at a lower temperature than the heat from the turbine engine 101 to define a low temperature source and an electrical power generator located on the aircraft 5 and using the temperature difference between the high temperature source and the low temperature source to generate electrical power. The turbine engine 101 may generate bleed air to form the high temperature source and the cryogenic fuel system has stored fuel 12 that provides the low temperature source. The stored fuel 12 may be a gas compressed to a liquid phase such as LNG.

Figure 8:
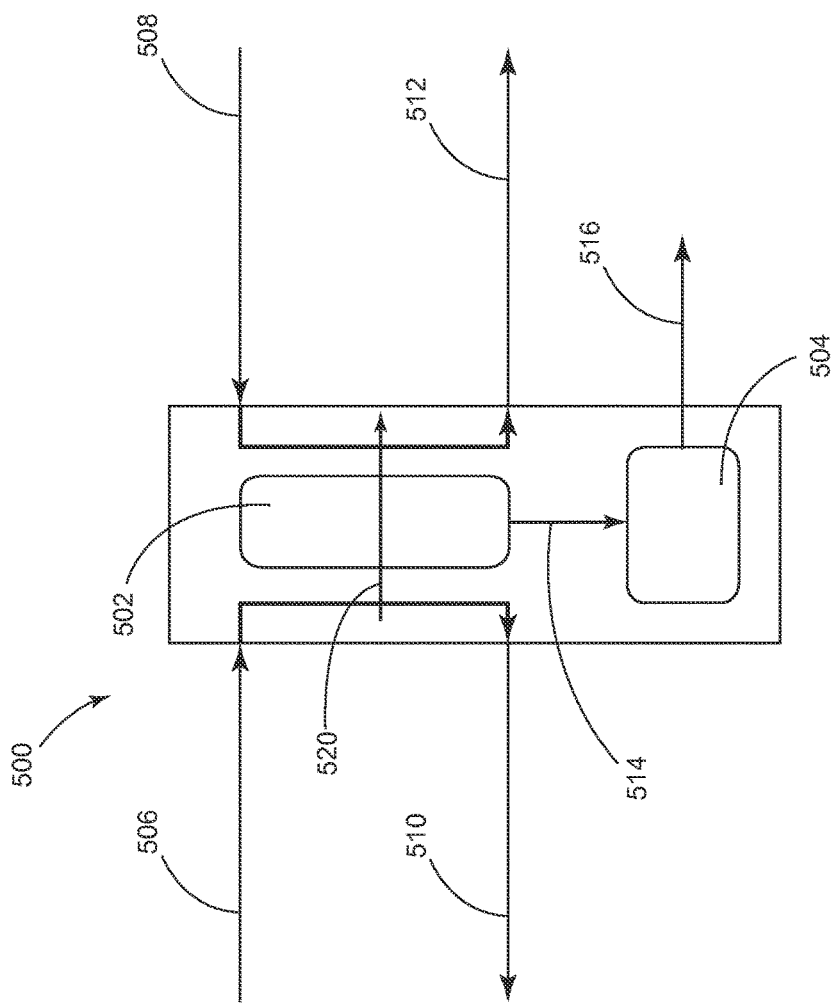
FIG. 8 is a block diagram of an example aviation electrical power generation system including a Stirling engine.

FIG. 8 illustrates one exemplary electrical power generation system 500, which may be utilized to produce electric power in an aircraft. More specifically, the system 500 has been illustrated as including an electrical power generator in the form of a mechanical generator, which converts the temperature difference into mechanical energy, whereby the mechanical energy may be used to generate electricity. More specifically, the mechanical generator may include a Stirling engine 502 producing mechanical energy from the temperature difference.

The Stirling engine 502 may be any suitable type of Stirling engine 502 including a free piston Stirling engine. A Stirling engine typically includes at least one heat source, at least one heat sink, and at least one heat exchanger. Free piston Stirling engines may have fewer parts and other advantages relative to other Stirling engines. The present disclosure contemplates that the Stirling engine 502 is a closed-cycle regenerative heat engine configured to operate by cyclic compression and expansion of a working fluid at different temperatures such that heat energy is converted to mechanical work. Generally, the working fluid is compressed in the colder portion of the engine and expanded in the hotter portion.

The Stirling engine 502 may be operably coupled with an electrical generator 504 such that the Stirling engine 502 may supply mechanical energy to the electrical generator 504 and the electrical generator 504 may supply electrical power. More specifically, the electrical generator 504 may be operably coupled to electrical systems of the aircraft 5 to supply electrical power thereto.

The Stirling engine 502 may be arranged to operate using the temperature potential of hot air that needs to be cooled for the environmental control system and cold LNG that needs to be warmed up. During operation, relatively hot bleed air from the engine compressor, at 506, and/or relatively cold LNG from the fuel system, at 508, may be supplied to the aviation electrical power generation system 500. It is contemplated that a high temperature source may function as a heat source for the Stirling engine 502 and that a low temperature source may function as a heat sink for the Stirling engine 502. In this manner, the Stirling engine 502 may use the relatively hot air at 506 as a heat source and/or the relatively cold LNG at 508 as a heat sink. After the hot air passes the Stirling engine 502, it may be supplied to the aircraft's environmental control system at 510. After the LNG passes the Stirling engine 502, it may be supplied to the fuel system at 512. The Stirling engine 502 may produce mechanical energy, which may be supplied to the electrical generator 504 as indicated by the arrow 514. The electrical generator 504 may supply electrical power to engine and/or aircraft systems as indicated by the arrow 516. The direction of heat movement is indicated by the arrow 520.

Figure 9:
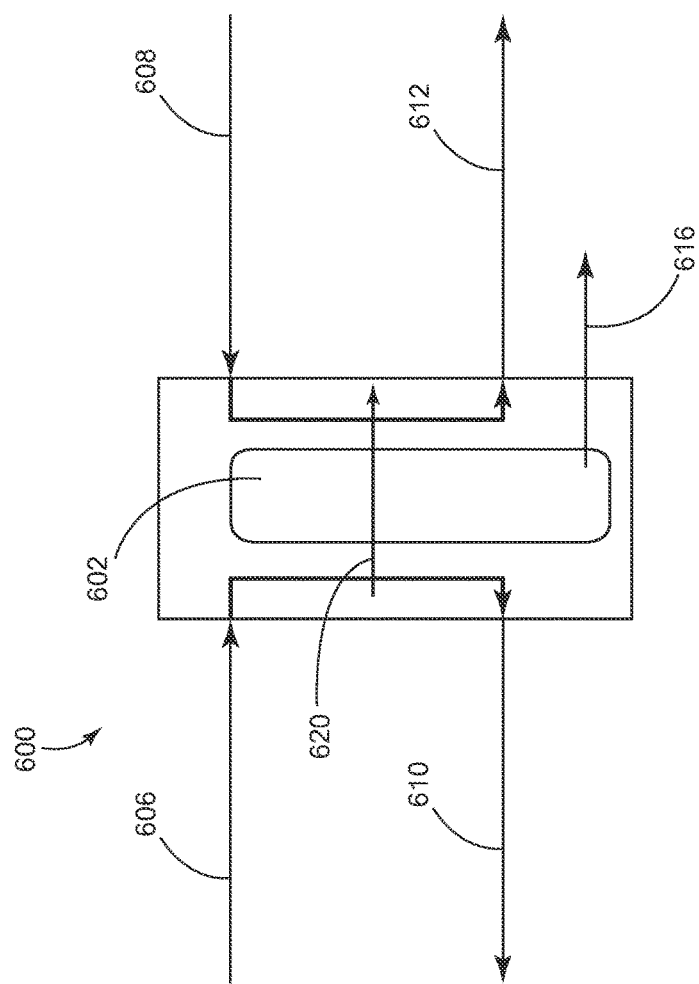
FIG. 9 is a block diagram of an example aviation electrical power generation system including a thermoelectric generator, all according to at least some aspects of the present disclosure.

It will be understood that the system for producing electrical power may be formed in any suitable manner, for example FIG. 9 illustrates a system 600, which is similar to the system 500 previously described and therefore, like parts will be identified with like numerals increased by 100, with it being understood that the description of the like parts of the system 500 applies to the system 600, unless otherwise noted. One difference is that the system 600 includes electrical power generation equipment in the form of a thermoelectric generator 602 instead of the Stirling engine 502 and generator 504. The thermoelectric generator 602 may be any suitable device configured to convert heat, in the form of a temperature difference, directly into electrical energy. For example, the thermoelectric generator 602 may produce electrical power using the temperature difference between the high temperature source and the low temperature source.

Thermoelectric generators typically operate using the "Seebeck effect" (also referred to as the "thermoelectric effect"). As with the above system 500, the temperature difference driving the thermoelectric generator 602 may be provided between relatively hot compressor bleed air indicated at 606 and relatively cold, cryogenic liquid fuel indicated at 608. During operation, relatively hot bleed air, at 606, from the engine compressor and/or relatively cold LNG, at 608, from the fuel system may be supplied to the aviation electrical power generation system 600. The thermoelectric generator 602 may use the temperature difference between the relatively hot air at 606 and the relatively cold LNG at 608 to produce electrical power. After the hot air passes the thermoelectric generator 602, it may be supplied to the aircraft's environmental control system at 610 and after the LNG passes the thermoelectric generator 602, it may be supplied to the fuel system at 612. The electrical power produced by the thermoelectric generator 602 may be supplied to an electrical system of the aircraft including but not limited to an engine of the aircraft and/or other aircraft systems.

Each of the above described systems contemplates that aircraft environmental control systems provide air, pressurization, and thermal control for aircraft cabins, among other functions. Typically, air is supplied to the ECS from aircraft engine compressors via one or more bleed ports. Various pressure regulators and shut-off valves control the supply of bleed air to the ECS. In some operating conditions, the bleed air may be hotter than is desired for the ECS. A pre-cooler may cool the bleed air supplied to the ECS by transferring heat to the fan air stream. Some example embodiments according to at least some aspects of the present disclosure may operate a Stirling engine 502 and/or a thermoelectric generator 602 using the relatively hot bleed air, either before, after, or instead of directing the bleed air through a pre-cooler.

By mating these two thermal potentials with a Stirling engine 502 and/or thermoelectric generator 602, electrical power for the aircraft may be produced. It is contemplated that the Stirling engine 502 and/or the thermoelectric generator 602 may be disposed fluidly in series or parallel with an LNG vaporizer. For example, a Stirling engine 502 and/or a thermoelectric generator 602 may be positioned upstream of a vaporizer to act as a preheater for LNG entering the vaporizer.

The exemplary systems above may be used in a method for producing electrical power in an aircraft. Such a method may include producing electric power in an aircraft having an engine emitting a relatively high heat and a cryogenic system emitting a relatively low heat, the method comprising generating electricity using the temperature difference between the relatively high heat and the relatively low heat to generate electricity. This may include generating bleed air from a turbine engine 101 of the aircraft 5 and using the bleed air as the relatively high heat and using compressed gas in a liquid state from the cryogenic system as the relatively low temperature heat. For example, relatively cold LNG from the LNG fuel system may be used and relatively hot bleed air from an engine compressor may be used. It is contemplated that generating electricity may include using the temperature difference to generate mechanical energy, which is then used to generate electricity. For example, generating the mechanical energy may include using the temperature difference to drive a Stirling engine or a thermoelectric generator. Alternatively, the temperature difference may be used to directly generate electricity by driving a thermoelectric generator.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power system for an aircraft, the system comprising:
    a turbine engine coupled to the aircraft and providing propulsive thrust and emitting heat during operation to define a high temperature source;
    a cryogenic liquid fuel system located within the aircraft and providing a cryogenic liquid fuel to the turbine engine, wherein the cryogenic liquid fuel emits heat at a lower temperature than the heat from the turbine engine to define a low temperature source; and
    an electrical power generator located on the aircraft and using a temperature difference between the high temperature source and the low temperature source to generate electrical power.

2. The system of claim 1 wherein the turbine engine generates bleed air to form the high temperature source and the cryogenic liquid fuel system has stored cryogenic liquid fuel that provides the low temperature source.

3. The system of claim 2 wherein the stored cryogenic liquid fuel is a gas compressed to a liquid phase.

4. The system of claim 1 wherein the electrical power generator comprises a mechanical generator that converts the temperature difference into mechanical energy, whereby the mechanical energy is used to generate electrical power.

5. The system of claim 4 wherein the mechanical generator comprises a Stirling engine producing mechanical energy from the temperature difference.

6. The system of claim 5 wherein the electrical power generator further comprises an electrical generator operably coupled to the Stirling engine such that the Stirling engine supplies mechanical energy to the electrical generator.

7. The system of claim 6 wherein the electrical generator is operably coupled to an electrical system of the aircraft and supplies electrical power to the electrical system.

8. The system of claim 6 wherein the Stirling engine comprises a free piston Stirling engine.

9. The system of claim 6 wherein the high temperature source functions as a heat source for the Stirling engine and the low temperature source functions as a heat sink for the Stirling engine.

10. The system of claim 1 wherein the electrical power generator comprises a thermoelectric generator configured to produce electrical power using the temperature difference between the high temperature source and the low temperature source.

11. A method for producing electrical power in an aircraft comprising a turbine engine and a cryogenic liquid fuel system, the method comprising:
    emitting heat, using the turbine engine, to define a high temperature source;
    emitting heat at a lower temperature than the heat from the turbine engine to define a low temperature source, using a cryogenic liquid fuel provided by the cryogenic liquid fuel system; and
    generating, using an electrical power generator, the electrical power using a temperature difference between the high temperature source and the low temperature source.

12. The method of claim 11 wherein generating electrical power comprises using the temperature difference to generate mechanical energy, which is used to generate electrical power.

13. The method of claim 12 wherein generating mechanical energy comprises using the temperature difference to drive a Stirling engine.

14. The method of claim 13, further comprising generating bleed air from a turbine engine of the aircraft and using the bleed air as the high temperature source and using compressed gas in a liquid state from the cryogenic liquid fuel system as the low temperature source.

15. The system of claim 10, further comprising a vaporizer, wherein the vaporizer is positioned downstream of the thermoelectric generator.

16. The system of claim 15, wherein the thermoelectric generator is configured to preheat the cryogenic liquid fuel prior to supply to the vaporizer.

17. The system of claim 16, wherein the vaporizer is configured to form a gaseous fuel using the cryogenic liquid fuel.

18. The system of claim 17, further comprising a combustor and a flow metering valve.

19. The system of claim 18, wherein at least one of the gaseous fuel and a kerosene based liquid fuel is provided to the combustor.

20. The system of claim 18, wherein the gaseous fuel is provided to the combustor via the flow metering valve.

* * * * *